US008170593B2

(12) United States Patent
Dolgov

(10) Patent No.: US 8,170,593 B2
(45) Date of Patent: May 1, 2012

(54) APPARATUS, METHOD, AND SYSTEM FOR CHANNEL SELECTION AND ALLOCATION IN MOBILE COMMUNICATIONS

(75) Inventor: Konstantin Dolgov, Taastrup (DK)

(73) Assignee: Motorola Solutions, Inc., Schaumburg, IL (US)

( * ) Notice: Subject to any disclaimer, the term of this patent is extended or adjusted under 35 U.S.C. 154(b) by 99 days.

(21) Appl. No.: 12/740,514

(22) PCT Filed: Nov. 11, 2008

(86) PCT No.: PCT/US2008/083091
§ 371 (c)(1),
(2), (4) Date: Aug. 5, 2010

(87) PCT Pub. No.: WO2009/064709
PCT Pub. Date: May 22, 2009

(65) Prior Publication Data
US 2010/0298020 A1 Nov. 25, 2010

(30) Foreign Application Priority Data

Nov. 16, 2007 (GB) .................................. 0722496.7

(51) Int. Cl.
*H04B 7/00* (2006.01)
(52) U.S. Cl. ......... 455/509; 455/450; 455/514; 455/515
(58) Field of Classification Search ............... 455/422.1, 455/450–453, 464, 509–515; 370/395.41, 370/329, 330; 375/E7.141
See application file for complete search history.

(56) References Cited

U.S. PATENT DOCUMENTS

| 5,159,596 A * | 10/1992 | Itoh ................................ 370/329 |
| 5,175,843 A * | 12/1992 | Casavant et al. ............... 716/103 |
| 5,668,714 A * | 9/1997 | Morikawa ......................... 700/2 |
| 2002/0198012 A1* | 12/2002 | Vukovic et al. ............... 455/509 |
| 2006/0030346 A1* | 2/2006 | Hayashi et al. ............... 455/515 |

FOREIGN PATENT DOCUMENTS

| EP | 1301051 A | 4/2003 |
| WO | 0001188 A1 | 1/2000 |
| WO | 0028744 A | 5/2000 |
| WO | 2006038838 A1 | 4/2006 |

OTHER PUBLICATIONS

UK Intellectual Property Office, Great Britain Application No. GB0722496.7, Search Report, Mar. 17, 2008, 4 pages.
PCT/US2008/083091, PCT Search Report and Written Opinion, mailed Mar. 26, 2009, 12 pages.

* cited by examiner

*Primary Examiner* — Dominic E Rego
(74) *Attorney, Agent, or Firm* — Barbara R. Doutre; Daniel R. Bestor

(57) ABSTRACT

A mobile communication system (100) includes a plurality of mobile stations (104, 105), a serving base station (101) and, associated with the base station, a channel selector (220, 309) for selecting and allocating downlink wireless traffic communication channels, the selector being operable: (i) to obtain an estimate of a ready time when a downlink wireless traffic signal including traffic data received from a source remote to the base station to be sent to at least one of the served mobile stations will be ready for sending; and (ii) to select and allocate for sending the downlink traffic signal a downlink traffic channel which is the first downlink traffic channel available following the ready time.

10 Claims, 6 Drawing Sheets

APPARATUS, METHOD, AND SYSTEM FOR CHANNEL SELECTION AND ALLOCATION IN MOBILE COMMUNICATIONS

CROSS REFERENCE TO RELATED APPLICATIONS

This application is a National Stage filing under 35 USC §371 of co-pending Patent Cooperation Treaty Application Number PCT/US2008/083091, filed Nov. 11, 2008, published to Publication No. WO 2009/064709 A1 on May 22, 2009, and entitled APPARATUS, METHOD, AND SYSTEM FOR CHANNEL SELECTION AND ALLOCATION IN MOBILE COMMUNICATIONS, which claims priority to UK Patent Application No. GB0722495.7, filed Nov. 16, 2007, published to Publication No. GB2454870A on May 27, 2009, and entitled CHANNEL SELECTION AND ALLOCATION IN MOBILE COMMUNICATIONS.

TECHNICAL FIELD

The technical field relates generally to an apparatus, a method and a system for channel selection and allocation in mobile communications. In particular, the technical field relates to channel selection and allocation for downlink traffic communications from a base station in a cellular communication system.

BACKGROUND

A cellular communication system is one in which mobile stations, such as portable or vehicle carried telephones or radios, wireless enabled computing devices, personal digital assistants and the like, can communicate via a network infrastructure. The infrastructure generally includes a plurality of base stations (base transceiver stations) which may be fixed in position and which may form a communication network. Each base station has one or more transceivers which serve mobile stations in a given region or area, known as a 'cell' or 'site', by wireless communication. The cells of neighbouring base stations are often overlapping.

Communications to and from mobile stations include system control communications and traffic communications. System control communications are made between the mobile stations and their serving base stations to establish and maintain operation in the system in accordance with a predetermined operating protocol. Traffic communications are made between a mobile station and another terminal to transmit user information such as speech or data, e.g. numerical or text data, picture information or video information. A traffic communication between mobile stations which are currently in the same cell may be established by a single base station or even directly between the mobile stations without the involvement of a base station. Traffic communications between mobile stations which are currently in different cells may be established by involvement of a plurality of base stations serving the various cells.

In the latter situation, a calling mobile station making a traffic communication or 'call' to a target mobile station makes a wireless transmission initially to a first base station serving the calling mobile station. Such a transmission from the mobile station to its serving base station is known as an 'uplink' transmission. The transmission received by the first base station is routed by the first base station to a second base station serving the target mobile station. In the case of a group call from the first mobile station to a plurality or 'group' of further mobile stations, the transmission is routed by the first base station to each of a plurality of receiving base stations serving the target mobile stations. The transmission from the first base station to the receiving base stations may possibly take place via other network nodes such as one or more routers or other base stations. The transmission is routed by each receiving base station to the target mobile station or stations served by that base station. Such a transmission from a base station to a served mobile station is known as a 'downlink' transmission.

Another possibility is for a traffic communication to be established between a mobile station and a target terminal other than another mobile station, such as a fixed terminal operated by a system operator or a fixed terminal connected to a recording device for recording the content of communications sent or received by mobile stations. In such a communication, the mobile station may be a transmitting or receiving terminal. In this case, the first base station serving the mobile station routes an uplink transmission received from the mobile station to the other terminal and routes a transmission from the other terminal as a downlink transmission to the target mobile station.

Thus, downlink traffic transmissions from a base station to one or more target mobile stations or other terminals served by or linked to the base station can originate from various remote transmitting sources. There can be a delay, a 'transmission delay', between transmission of a traffic signal by a transmitting source and reception by a base station which has to forward the signal (to a served target mobile station or other terminal). There can also be a delay, a 'BS processing delay', in the receiving base station between reception of the traffic signal and forwarding of the signal as a downlink wireless signal.

In general, the transmission delay depends on the location of the transmitting source and the route of the transmission to reach the serving base station of the target mobile station(s).

In order for a base station to send the downlink traffic signal to a target mobile station, a downlink traffic channel has to be allocated to allow the signal transmission to take place. The allocation of the downlink traffic channel may be made by a processor such as a resource scheduler associated with the base station, e.g. incorporated within the base station. The form of the allocated channel depends on the communication protocol operated in the mobile communication system. For example, some systems such as a TETRA (Terrestrial Trunked Radio) system, that is a system operating according to the protocol specified in the TETRA standard as defined by ETSI (the European Telecommunications Standards Institute), use a time slotted Time Division Multiple Access (TDMA) protocol in which traffic signals are sent in allocated time slots on different allocated carrier frequencies. In a TETRA system, the time slots have a length of 14.16667 milliseconds, four such slots make up a frame and eighteen frames make up a multiframe having a length of approximately one second.

Where a downlink traffic signal transmission is to be made by a base station there can be an alignment delay (which is part of the BS processing delay mentioned above) between the base station having the downlink traffic signal ready to be sent and a traffic channel being available for the signal transmission to be made. Undesirably, this alignment delay can have a length or duration which is significant. For example, in a TETRA system, the alignment delay can have a length of up to one frame. Such a delay can seriously affect the quality of the received information at the target mobile station or other terminal, e.g. the quality of received speech information at the beginning of a speech conversation. This problem is noticeable especially in a full duplex system, that is a system in which uplink transmissions received by a base station and downlink transmissions sent by the base station can be made at the same time, e.g. in the same time slots on different carrier frequencies.

Thus, there exists a need for a base station and an associated processor, and a system and a method employing the base station and the processor, for use in mobile communications, which addresses at least some of the shortcomings of past and present techniques and/or procedures for making downlink transmissions.

BRIEF DESCRIPTION OF THE ACCOMPANYING DRAWINGS

The accompanying drawings, in which like reference numerals refer to identical or functionally similar items throughout the separate views which, together with the detailed description below, are incorporated in and form part of this patent specification and serve to further illustrate various embodiments of concepts that include the claimed invention, and to explain various principles and advantages of those embodiments.

Figure 1:
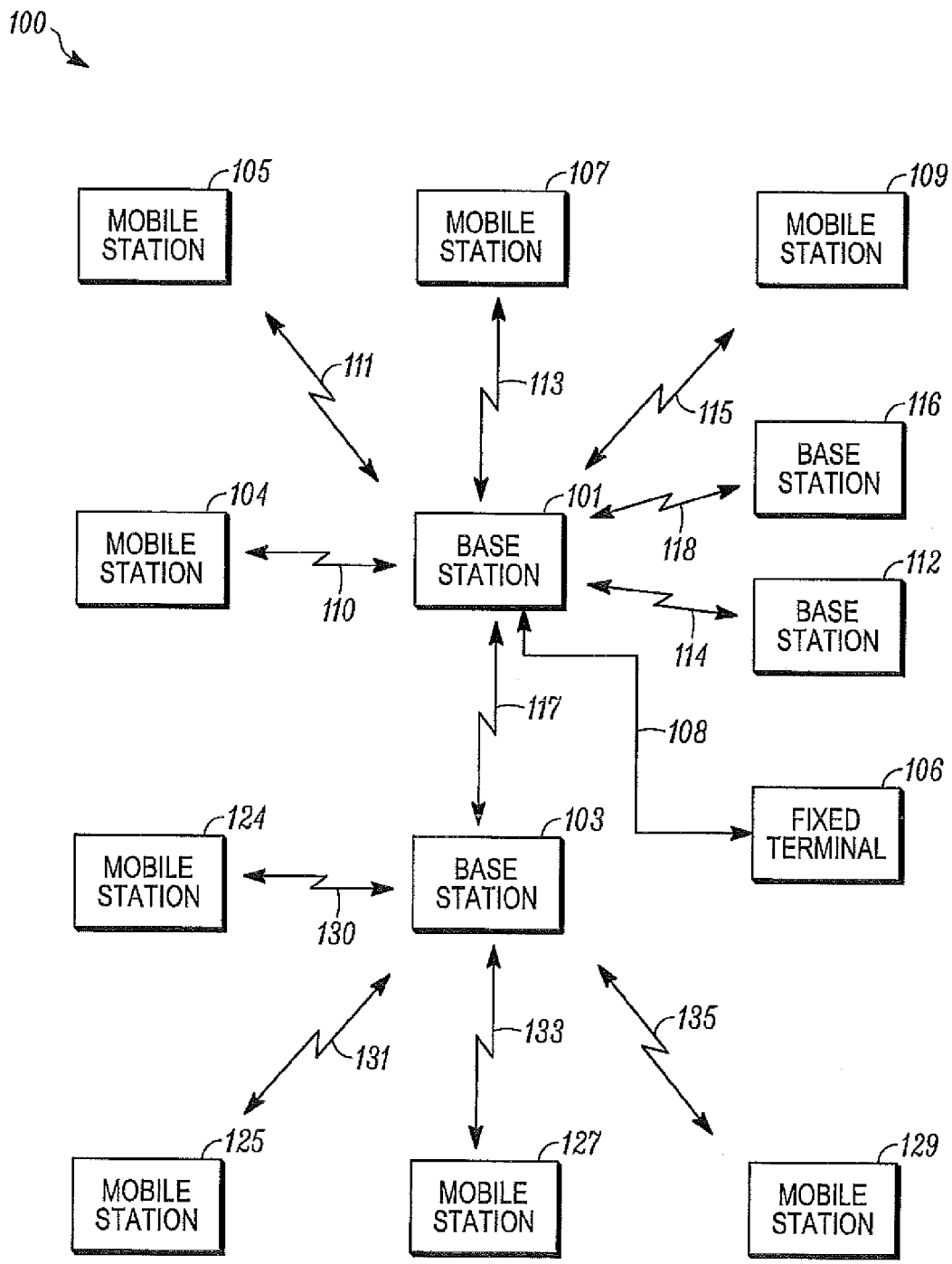
FIG. 1 is a block schematic diagram of an illustrative mobile communication system for operation in accordance with embodiments of the invention.

Skilled artisans will appreciate that items shown in the drawings are illustrated for simplicity and clarity and have not necessarily been drawn to scale. For example, the dimensions of some of the items may be exaggerated relative to other items to assist understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood items that are useful or necessary in a commercially feasible embodiment may not be depicted in order to facilitate a less obstructed view of these various embodiments.

DETAILED DESCRIPTION

Generally speaking, pursuant to the various embodiments to be described, there is provided a mobile communication system including a plurality of mobile stations, a base station operable to serve the mobile stations with wireless communications and, associated with the base station, a channel selector operable to allocate downlink wireless traffic communication channels for sending downlink wireless traffic signals by the base station to the served mobile stations, the channel selector being operable: (i) to obtain an estimate of a ready time when a downlink wireless traffic signal including traffic data received from a source remote to the base station to be sent to at least one of the served mobile stations will be ready for sending by the base station; and (ii) to allocate for sending the downlink traffic signal a downlink traffic channel which is the first downlink traffic channel available following the estimated ready time.

The channel selected and assigned by the channel selector to begin the downlink transmission can be available with minimum delay after the ready time. Beneficially, this selection improves the traffic signal quality at the beginning of the downlink transmission. The selection of the channel, e.g. a selected time slot on a selected carrier frequency, giving minimum delay may also minimise processing operations since data packet queuing may be minimised or eliminated.

Those skilled in the art will appreciate that these recognized advantages and other advantages described herein are merely illustrative and are not meant to be a complete rendering of all of the advantages of the various embodiments of the invention.

Referring now to the accompanying drawings, and in particular to FIG. 1, there is shown a block schematic diagram of an illustrative mobile communication system 100 for operation in accordance with embodiments of the invention. The system 100 operates in accordance with a pre-defined wireless communication protocol to provide communication of information, including system control information and user information such as user speech and/or data, herein referred to as 'traffic information' or 'traffic signals'. The operating protocol of the system 100 may for example be in accordance with the TETRA standard (TETRA 1 or TETRA 2) or another wireless communication standard, such as the APCO Project 25 standard (defined by the Association of Public-Safety Communications Officials-International, Inc.).

The system 100 includes a first base station (BS) 101 having wireless links with a plurality of user terminals located in a service cell or site defined by the position of the BS 101. Four of many possible mobile stations linked to the BS 101 are shown, namely mobile stations (MSs) 104, 105, 107 and 109 having wireless links 110, 111, 113 and 115 respectively with the BS 101. The BS 101 thereby serves user terminals including the MSs 104, 105, 107 and 109 with communications to and from other communication terminals, including mobile stations either served by the BS 101 or by other base stations of the system 100 operably linked to the BS 101 or in other systems (not shown) operably linked to the system 100.

The BS 101 may also be operably connected to at least one fixed terminal. A fixed terminal 106 is shown in FIG. 1 operably connected to the BS 101 by a link 108 which may be a wired link or a wireless link. The fixed terminal 106 may for example be a control terminal operated by an operator who sends and receives operational messages within the system 100 to users of mobile stations within the system 101. Alternatively, the fixed terminal 106 may be a terminal connected to a recording device, e.g. a speech or data recorder, to record traffic signals sent via the BS 101.

The system 100 may also include one or more further BSs each of which serves MSs within a coverage region or cell defined by the position of the BS. For example, the system 100 is shown in FIG. 1 as including a second base station (BS) 103 and further MSs 124, 125, 127 and 129 served by the BS 103 and having wireless links 130, 131, 133 and 135 respectively with the BS 103. The BS 103 is shown having a wireless link 117 with the BS 101. The wireless link 117 is optional. It could be replaced by a fixed, e.g. cable or wired, link. The link 117 may include one or more other communication nodes (not shown) such as one or more other base stations, routers or satellite terminals. The BS 103 has wireless links with a plurality of user terminals in a service cell or site defined by the position of the BS 103. The user terminals include the MSs 124, 125, 127 and 129 and may also include at least one fixed terminal (not shown). The BS 103 thereby serves user terminals including the MSs 124, 125, 127 and 129 with wireless communications to and from other mobile stations either served by the BS 103 or by other base stations of the system 100 operably linked to the BS 103, e.g. the BS 101, or in other systems (not shown) operably linked to the system 100.

The system 100 may include further base stations. Two such further base stations are shown in FIG. 1, namely a base station (BS) 112 and a base station (BS) 116. The BS 112 is shown having a wireless link 114 with the BS 101. The BS 116 is shown having a wireless link 118 with the BS 101. Each of the wireless link 114 and the wireless link 116 is optional and could be replaced by a fixed, e.g. cable or wired, link. Each of the link 114 and the link 116 may include one or more other communication nodes (not shown) such as one or more other base stations, routers or satellite terminals. The BSs 112 and 116 have wireless links with further MSs (not shown) to serve such further MSs.

Communications between the BS 101 and each of the MSs it serves, including the MSs 104, 105, 107 and 109 via the links 110, 111, 113 and 115 respectively, are made using the selected wireless communication protocol as discussed above. Similarly, communications between the BS 103 and each of the MSs it serves, including the MSs 124, 125, 127 and 129 via the links 130, 131, 133 and 135 respectively, are made by the same selected protocol. Similarly, communications between the BS 112 and each of the MSs it serves and between the BS 116 and each of the MSs it serves are made by the same selected protocol.

The system 100 may include known infrastructure components or sub-systems in addition to the BSs 101, 103, 112 and 116. For example, the system 100 may include one or more zone controllers (not shown) which provide co-ordination and control of the BSs in a given geographical zone or area and one or more databases which record details of MSs currently operating in the system 100.

Figure 2:
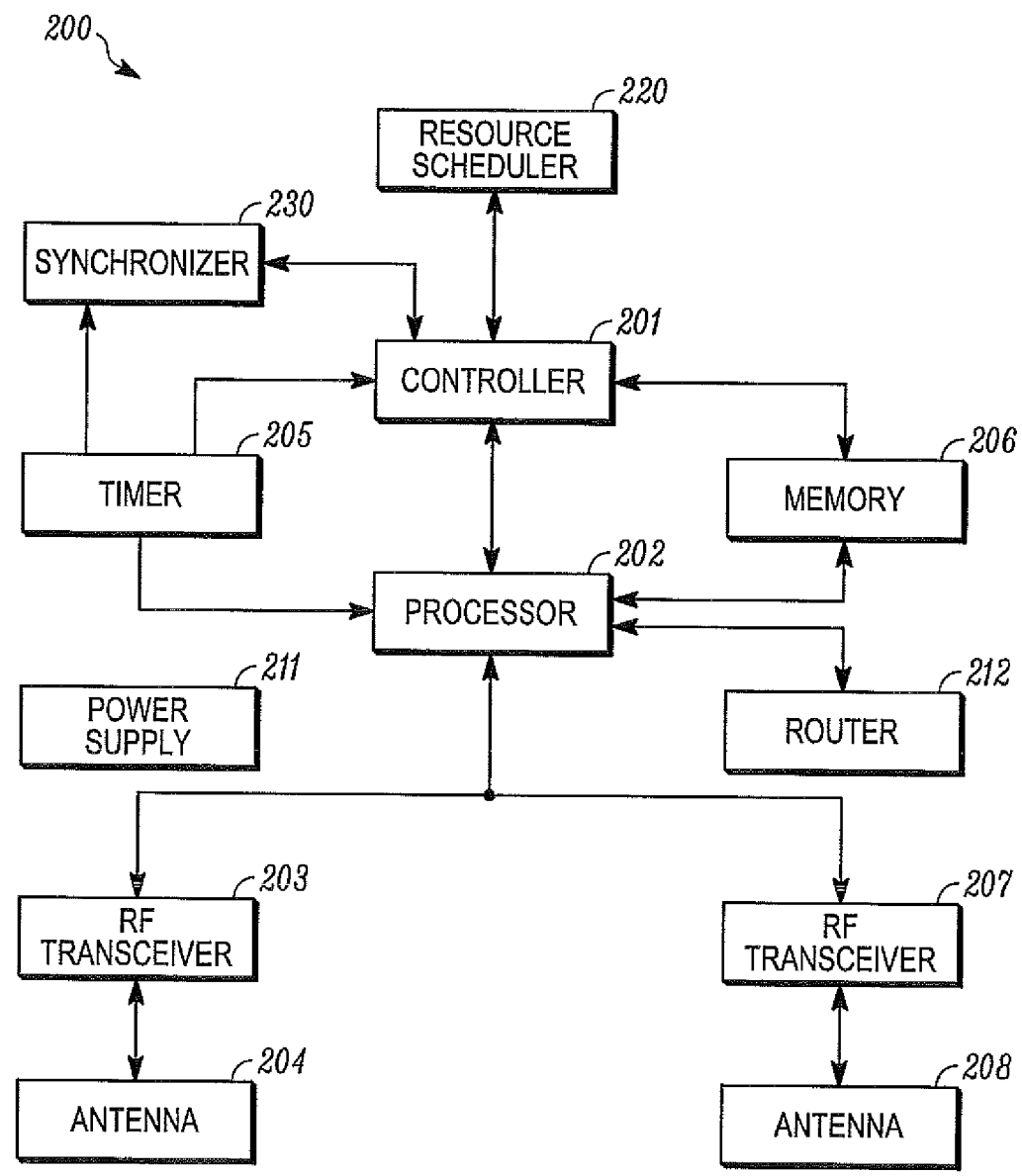
FIG. 2 is a block schematic diagram of an illustrative layout of a base station of the system of FIG. 1.

FIG. 2 shows an illustrative layout 200 of one of the BSs of the system 100. Any one or more of the BSs of the system 100, including each of the BS 101, the BS 103, BS 112 and the BS 116, may have the layout 200. As will be apparent to those skilled in the art, the layout of each of the BSs may take one of many possible forms, and the layout 200 is therefore to be regarded as illustrative rather than definitive. Each BS of the system 100 may have more or less components than illustrated in the layout 200.

In the layout 200, a controller 201 controls functional operations of the BS. A processor 202, e.g. a digital signal processor, operably connected to the controller 201, processes information sent in RF (radio frequency) signals to and from the BS.

The controller 201 and the processor 202 are operably connected to a timer 205, which is a clock providing operational timing, and to a memory 206 which stores data and programs needed in operation by the controller 201 and the processor 202. The processor 202 is operably connected to a plurality of RF transceivers two of which are shown, namely an RF transceiver 203 and an RF transceiver 207. Each of the RF transceivers 203 and 207 transmits and receives radiated RF signals including signals carrying information sent to and from user terminals including MSs served by the BS. The signals are delivered over-the-air to and from an antenna 204 connected to the RF transceiver 203 or to and from an antenna 208 connected to the RF transceiver 207.

When the RF transceiver 203 receives via the antenna 204 an incoming RF signal, the signal is passed to the processor 202. Similarly, when the RF transceiver 207 receives via the antenna 208 an incoming RF signal, the signal is passed to the processor 202. The processor 202 converts each incoming signal received by the RF transceiver 203 or by the RF transceiver 207 into an electronic signal including communicated information. The communicated information may include system control information and/or user communicated traffic information for onward delivery.

Where the communicated information comprises system control information, the electronic signal produced by the processor 202 may be passed to the controller 201. Where the electronic signal produced by the processor 202 comprises user communicated traffic information for onward delivery it may be delivered to a router 212 which routes the electronic signal toward its destination, e.g. via a wired or wireless link to another base station (such as via the link 117, the link 114 or the link 118) or to a mobile station (other than the originator of the information) served by the BS (such as the BS 101) via the processor 202.

Similarly, each incoming electronic signal received at the router 212 (from a source other than the processor 202) which includes communicated user traffic information to be sent to one of the user terminals including mobile stations served by the BS having the layout 200, may be routed by the router 212 to the processor 202. The processor 202 processes each electronic signal which it receives from the router 212 into a form suitable for inclusion in an RF signal for transmission by the RF transceiver 203 via the antenna 204 or for transmission by the RF transceiver 207 via the antenna 208.

The processor 202 also prepares and receives system control messages and data received from the controller 201 to be sent to the mobile stations and other terminals (if any) served by the BS.

The BS having the layout 200 includes a synchronizer 230 operably connected to the timer 205 and the controller 201. The synchronizer 230 operates in a known manner, e.g. by matching a fixed data pattern included in and recognized in incoming signals with a corresponding fixed pattern held in the BS to synchronize the incoming signal to operations within the BS.

The BS having the layout 200 includes a power supply 211, e.g. from the main (mains) electricity supply, which provides a source of electrical energy for all active components of the BS.

Although the BS having the layout 200 is shown in FIG. 2 as having two RF transceivers coupled respectively to two antennas 204 and 208, it could have one combination or alternatively more than two combinations of an RF transceiver and an antenna. In any event, the BS may operate in a full duplex manner. Uplink communications from MSs to the BS may be sent in uplink channels, and downlink communications from the BS to MSs may be sent in separate downlink channels. The uplink channels may for example use at least one carrier frequency different from at least one carrier frequency of the downlink channels. The channels in each case may comprise slots of a time slotted timing sequence, e.g. as employed in the protocols according to the TETRA or APCO Project 25 standard.

The BS having the layout 200 also includes a resource scheduler 220 operably coupled to the controller 201. The resource scheduler 220 may be incorporated within the controller 201. The resource scheduler 220 is a processor, e.g. a digital signal processor, which operates a programmed algorithm to carry out functions within the BS relating to scheduling of uplink and downlink communications between the BS 101 and MSs served by the BS, for example between the BS and each of the MSs served by the BS (such as the MSs 104, 105, 107 and 109 with respect to BS 101). In particular, the resource scheduler 220 computes, organises and specifies the allocation of the channels to be used for the uplink and downlink communications. For example, where the operating protocol of the system 100 is a time slotted protocol and time slots in different channels are allocated to different communications according to a Time Division Multiple Access (TDMA) procedure, the resource scheduler 220 specifies which slots of each channel are to be used for the different communications. The resource scheduler 220 may send to MSs served by the BS advance notifications of resources, e.g. time slots in a given channel, to be used for a given communication.

The resource scheduler 220 may be exclusively associated with the particular BS having the layout 200 or may be associated with each of a plurality of BSs. As shown in FIG. 2, for example, the resource scheduler 220 may be incorporated within the BS having the layout 200, e.g. coupled to the controller 201 of the BS and to the timer 205.

Figure 3:
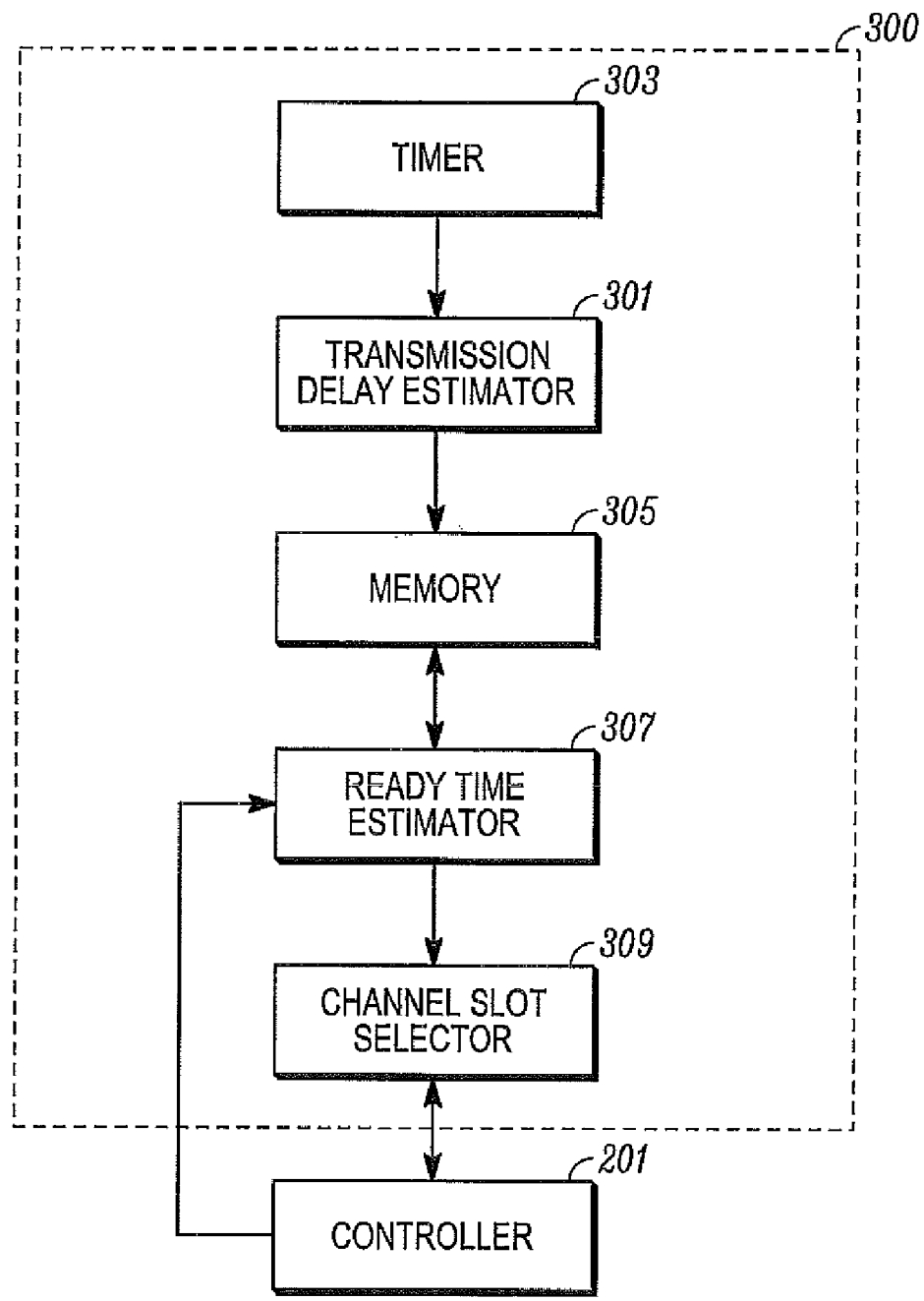
FIG. 3 shows an illustrative form of a resource scheduler coupled to a controller of the base station layout of FIG. 2.

FIG. 3 is a schematic block diagram of an illustrative layout 300 of components in the resource scheduler 220 coupled to the controller 201. The layout 300 comprises a transmission delay estimator 301 which is a processor that operates a test procedure to produce an estimate of a one-way transmission delay between a particular transmitting source (remote to the BS having the layout 200) and the BS having the layout 200. The transmission delay estimator 301 is operably coupled to a timer 303 (which may be the timer 205 or a separate timer) which operates to time stamp data packets used in the test procedure of the estimator 301. The transmission delay estimator 301 is also operably coupled to a memory 305 (which may be the memory 206 or a separate memory) in which data relating to estimates made by the estimator 301 are recorded. The layout 300 also includes a ready time estimator 307 which is operably coupled to the memory 305 and the controller 201. The ready time estimator 307 receives from the controller 201 a signal indicating when a traffic signal is to be sent from the particular remote source. The indicated traffic signal may be received by the antenna 204 and the RF transceiver 203, or the antenna 208 and the RF transceiver 207, and delivered to the processor 202 (FIG. 2) for processing by the processor 202 for downlink transmission to one or more target MSs, e.g. the MS 104 and the MS 105 from the BS 101. The ready time estimator 307 retrieves from the memory 305 a value of the most recent one-way transmission delay recorded by the memory 305, e.g. as measured by the transmission delay estimator 301, for a traffic signal sent between the particular source and the BS. The ready time estimator 307 estimates a ready time when the indicated traffic signal will be ready for sending from the processor 202 to the at least one target MS. The layout 300 also includes a channel slot selector 309 which is operably coupled to the ready time estimator 307 and to the controller 201. The channel slot selector 309 is a processor which receives from the controller 201 a signal indicating when the traffic signal is to be sent from the particular remote source. The channel slot selector 309 operates to select one or more time slots in which the indicated signal is to be sent as a downlink traffic signal from the BS. The channel slot selector 309 receives from the ready time estimator 307 a signal indicating the ready time estimated by the ready time estimator 307. The channel slot selector 309 selects for the downlink traffic signal transmission the next available traffic slot immediately following the estimated ready time. The channel slot selector 309 provides a signal to the controller 201 to indicate the selected slot to the controller 201, e.g. for onward notification to the at least one target MS.

It will be apparent to those skilled in the art that the operations of the transmission delay estimator 301, the ready time estimator 307 and the channel slot selector 309 may be combined in a single processor, e.g. a digital signal processor, which may additionally carry out other processing operations of the BS, e.g. operations of components in the layout 200 described earlier.

Figure 4:
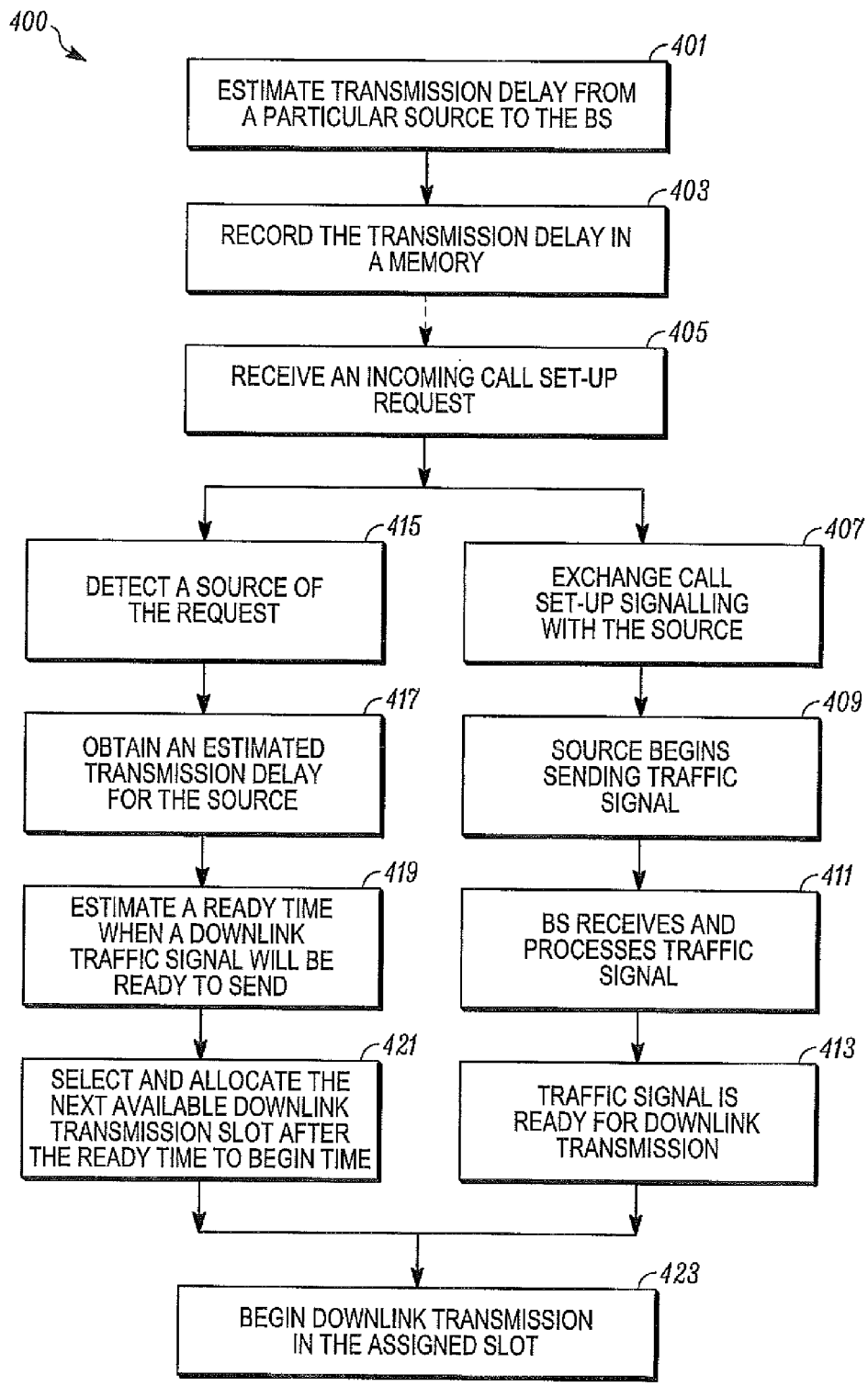
FIG. 4 is a flowchart of an illustrative method of operation embodying the invention in the system of FIG. 1.

FIG. 4 is a flowchart of an illustrative method 400 of operation of a BS of the system 100 in accordance with an embodiment of the invention. The method 400 may be employed to establish downlink transmission of a traffic signal from the BS to one or more target MSs served by the BS, e.g. from the BS 101 to the MS 104 or to the MS 104 and the MS 105. In a step 401, a transmission delay between a particular remote transmitting source from which the BS is to receive an incoming traffic signal to be forwarded by the BS 101 is estimated. The transmitting source may for example be an MS operating within the system 100, e.g. one of the MSs 124 or 125, or another BS serving such an MS, e.g. one of the BSs 103, 112 and 116, or the fixed terminal 106. The estimate in step 401 may be made by the estimator 301 (FIG. 3) or by another processor of the BS, e.g. the controller 201. In a step 403, the estimate made in step 401 is recorded in a memory, e.g. the memory 305, associated with the BS. Steps 401 and 403 may be operated for each of a plurality of different sources so that the transmission delay from each of the sources to the BS be estimated and recorded. In a step 405, an incoming call set-up request from a particular source is detected, e.g. by the controller 201. Such a call set-up request indicates which target MS or MSs served by the BS should receive a traffic signal to be sent by the source when the call has been established. The receipt of the request in step 405 causes an exchange, in a step 407, of preliminary call set-up signalling to take place between the BS and the source in accordance with the communication protocol employed in the system 100.

The signalling in steps 405 and 407 may be sent on a control channel rather than on a traffic channel. This signalling involves a delay. However, this delay can be ignored because received traffic signal quality does not depend on it. The delay could in principle be measured but such a measurement is of little value because it depends on the loading of network processors and is therefore likely to change from one call to another on the same routing path.

Following the preliminary signalling exchange in step 407, the particular source begins sending in a step 409 a traffic signal, e.g. comprising speech information or data packets. The BS receives and processes the traffic signal in a step 411, e.g. by the controller 201 and the processor 202. Following step 411, the traffic signal is ready, in a step 413, for downlink transmission by the BS to the target MS or MSs indicated in the call set-up request, e.g. the MS 104 or the MSs 104 and 105 where the BS is the BS 101.

Following receipt by the BS of the call set-up request in step 405, a traffic channel is allocated by the resource scheduler 220. In the prior art there would be no direct correlation between the channel allocation and steps 407 to 413. However, in accordance with an embodiment of the invention, the resource scheduler 220 allocates the traffic channel selectively in the following manner. In a step 415, the BS, e.g. by the resource scheduler 220 or the controller 201, detects a source of the request received in step 405. In a step 417 following step 415, the BS, e.g. by the ready time estimator 307, obtains an estimated one-way transmission delay for the source to make a transmission to the BS. The estimated delay may be a value previously recorded (e.g. in step 403) in a memory, e.g. the memory 305, and retrieved from the memory in step 417. Alternatively, the estimated transmission delay may be obtained by the BS, e.g. by the ready time estimator, by carrying out a fresh estimation of the delay. Illustrative examples of methods of estimating the delay are described herein with reference to FIG. 5. Next, in a step 419, the BS, e.g. by the ready time estimator 307, uses the obtained estimated transmission delay to estimate a ready time when a downlink traffic signal will be ready to send. The ready time which is estimated in this way is the actual ready time that is represented by step 413. The ready time will depend upon the time, i.e. the one way transmission delay, for the sending in step 409 of the traffic signal from the source to the BS, and the time for the BS to receive and process the traffic signal in step 411. The BS is able to estimate the ready time if it knows the estimated one-way transmission delay. In a step 421, the BS, e.g. by the channel slot selector 309, selects and allocates a next available downlink slot of a downlink traffic channel following the estimated ready time to begin sending the downlink traffic signal. In a step 423, the BS begins sending the downlink traffic signal in the slot allocated in step 421. Thus, the slot allocated in step 421 is selected, e.g. by the channel slot selector 309, so that the alignment delay which occurs between the traffic signal being ready for downlink transmission in step 413 and the downlink transmission beginning in step 423 is minimized. For example, if the estimated ready time (when the traffic signal is ready for downlink transmission as represented by step 413) occurs part-way through the duration of a 'Slot 2' of a given frame and 'Slot 3' of that frame may be used as a traffic transmission slot, that Slot 3 is selected to begin the transmission of the traffic signal.

The transmission of the traffic signal may require more than one slot, and so, in accordance with the communication protocol employed in the system 100, the BS may employ further traffic slots allocated by the resource scheduler 220, e.g. by the channel slot selector 309, following the slot allocated in step 421 to continue sending of the traffic signal.

As described earlier, in a system operating in accordance with the prior art, data packets when ready to be sent in a downlink traffic transmission are queued to wait for the allocated timeslot in which transmission of the packets can begin. This can cause a significant delay, e.g. of up to one frame (56 milliseconds), giving a significant impairment of received traffic signal quality, e.g. speech quality, at the beginning of the downlink transmission, especially when the BS is operating in full duplex mode (the usual mode). In contrast, by the method 400 embodying the invention, the ready time of the data for downlink transmission can be calculated accurately and the channel slot can be selected and allocated to begin the downlink transmission with minimum delay after the ready time. Beneficially, this selection and allocation improves the traffic signal quality, especially received speech quality, at the beginning of the downlink transmission. Where the traffic data comprises data other than speech, a shorter response time can be obtained for client-server applications routed through the BS, and an improved performance can be obtained for downlink transmission of any time sensitive traffic. Furthermore, the selection of the channel, e.g. a selected time slot on a selected carrier frequency, giving minimum delay may also minimise processing operations since data packet queuing may be minimised or eliminated.

In the method 400 described with reference to FIG. 4, step 401 involves measuring the one-way transmission delay to a particular receiving BS from a particular remote transmitting source. As noted earlier, the particular transmitting source may be another BS of the system 100, an MS of the system 100 served either by the receiving BS of the system 100 or another BS, or another terminal such as the fixed terminal 106.

Knowledge by the receiving BS of a recent measurement of the one-way transmission delay from a particular transmitting source, even when the transmitting source is a fixed terminal, e.g. another BS, is useful for several reasons. A first reason is that the transmission delay, especially for delivery of packet data via packet data network (e.g. operating according to the Internet Protocol), can vary depending on the current traffic loading on the network and the extent of any traffic queuing caused as a result of the loading. A variable transmission delay between two fixed nodes in a network having the same network topology can result. A second reason is that communications between given nodes, e.g. fixed base stations, which have to be sent via intermediate nodes, e.g. other base station (s) and/or router(s), can potentially involve different routes within the network resulting from dynamic re-routing in the network, e.g. when an operational failure of one of the intermediate nodes occurs. So a recently made delay measurement is likely to be more reliable than a delay measurement which was not made recently. In any event, it is desirable to verify the one-way transmission delay by applying step 401 periodically, preferably frequently, so that the delay value used in the calculations in the method 400 is reliable to give efficient allocation of resources.

The one-way transmission delay measurement required in step 401 may be carried out using a number of different procedures. For example, one procedure which may be used involves sending from the receiving BS, that is the BS that is to forward a downlink traffic signal to one or more MSs served by the BS, one or more test data packets by unicast transmission to the remote transmitting source of the traffic data received by the receiving BS. Such a procedure may not be suitable where the routing path to be employed to send the traffic data is a multicast tree rather than a unicast path. Another procedure which may be used involves setting up a special routing path, e.g. a multicast tree, to send a test signal. Such a procedure may require additional processing capabilities of network nodes such as routers and may produce a measurement result different from the delay in the routing path actually used to send the traffic data. Another procedure which may be used involves injecting test packets between traffic data packets. This procedure can lead to increased jitter and can lead to performance problems in the network, since it adds extra traffic load on the network; as the test packets are injected, the traffic data packets have to queue behind the test packets. A further procedure which may be used involves adding time stamp information to traffic data packets when they are transmitted from the source. This procedure consumes additional bandwidth overhead in the network.

A procedure to measure the one-way transmission delay which is preferred because it avoids the problems mentioned above which may be associated with other procedures, particularly the use of additional test data during traffic transmissions, is a new procedure which will be described as follows.

In some systems, a routing path is established to allow transmission of traffic signals to take place on a traffic channel. The routing path may comprise a multicast tree. There may be periods during which no traffic signals are sent on the routing path. For example, in TETRA systems a hang time is applied which is such a period. The hang time is an interval of time that is applied by a controlling processor, such as a zone controller, in a call between a first terminal and (at least) a second terminal. Assuming the call is to provide a speech conversation and the first terminal transmits first, the hang time begins when the user of the first terminal stops speaking. If the user of the second terminal, or another terminal of the same group (if the conversation involves users of a group of more than two terminals), wishes to continue the conversation, and indicates an intention to continue usually by activating a 'push to talk' ('PTT') button or switch of the terminal, the routing path remains open and the call can continue on the allocated traffic channel. If the hang time expires before any terminal involved in the call continues the conversation, the controlling processor clears the routing path and the traffic channel. The cleared routing path and the traffic channel are available for use by other pairs or groups of terminals in the system 100. Thus, during the hang time, no traffic signal is transmitted until the second terminal or another terminal of the same group indicates that it is to continue the conversation, e.g. by operation of the PTT switch or button. In the preferred procedure to measure the transmission delay between a transmitting source and a particular receiving BS, the transmission delay may thus be measured during a period which is a detected hang time.

As noted earlier, it is desirable to measure the transmission delay from a particular transmitting source periodically. The frequency of the measurements may be determined by the receiving BS, e.g. by the transmission delay estimator 301. The transmission delay may be measured each time a hang time in an established call is detected. Alternatively, the frequency of measurement may be less than the frequency of each detection of a hang time. The frequency of detection may be adjusted dynamically depending on the extent of traffic flow on the route between the transmitting source and the receiving BS. For example, statistical information relating to the frequency and/or length of calls on the route may be maintained, e.g. in the memory 206 of the receiving BS, and used by the receiving BS to adjust the frequency of delay measurement. The frequency of measurement may be increased as the extent of traffic, e.g. average call length per unit time, on the route decreases.

Figure 5:
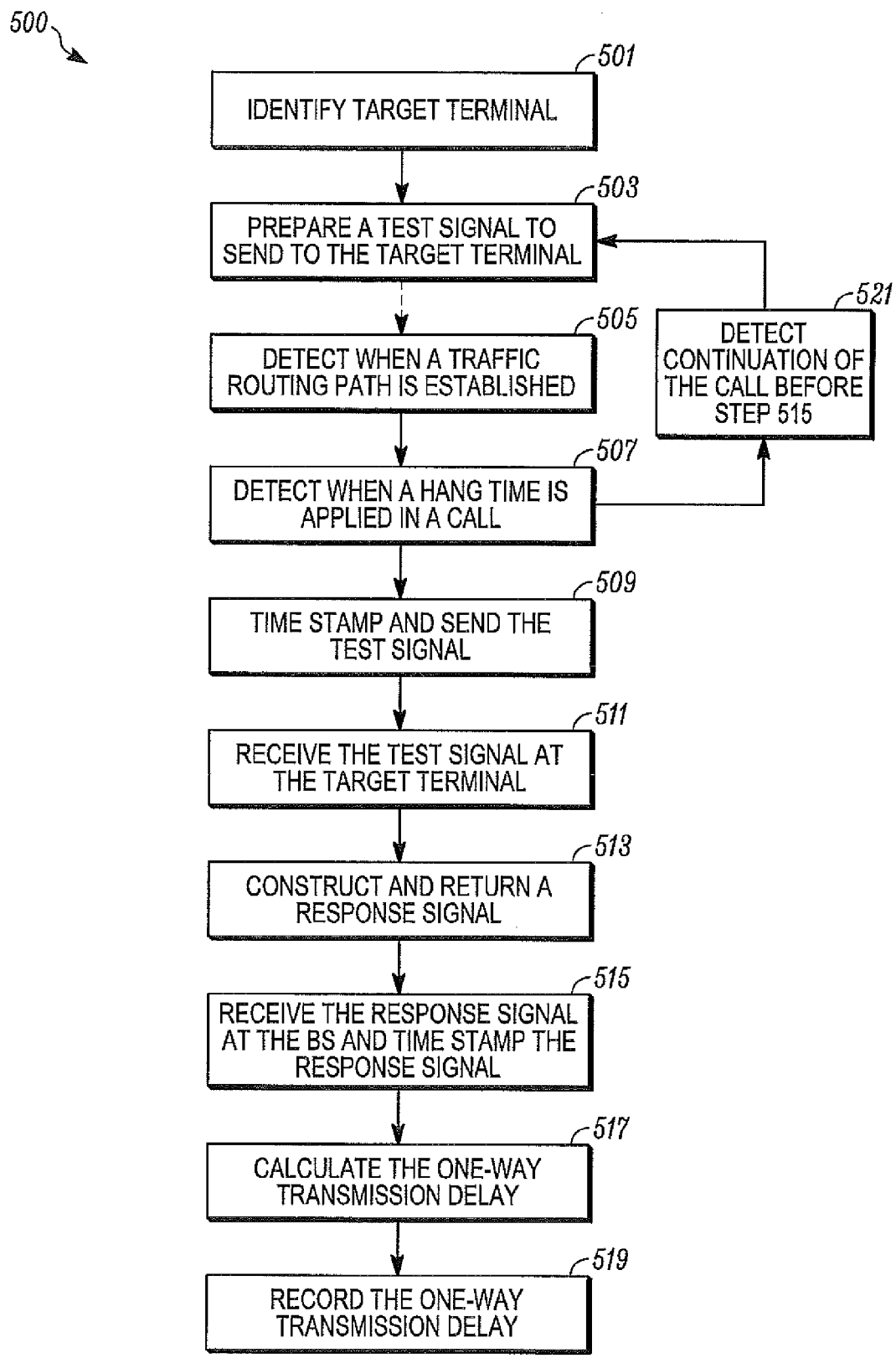
FIG. 5 is a flowchart of an illustrative method of estimating transmission delay which may be used in the method illustrated in FIG. 4.

An illustrative measurement method 500 including the new procedure is described as follows with reference to FIG. 5. The method 500 may be operated for example by the transmission delay estimator 301 (FIG. 3). In the method 500, it is assumed for illustration purposes that the transmission delay to be measured is between the BS 101 and a target terminal such as the BS 103, the BS 112, the BS 116 or the fixed terminal 106. The target terminal will be the transmitting source when the measured delay is used in step 419 (FIG. 4) to estimate a ready time at the BS 101 of a traffic signal sent from the transmitting source. In a step 501 of the method 500, the BS 101 identifies the target terminal involved. In a step 503, the BS 101 prepares a test signal to send to the target terminal when a suitable routing path is available. The test signal may comprise a specific measurement data packet which has a protocol structure similar to that of a traffic data packet sent via the same routing path. The test signal includes an identifier which will be recognised by the target terminal as a test signal. The test signal also includes a field allowing a transmission time stamp to be added by the BS 101 to the signal when sent.

In a step 505, the BS 101 detects when a traffic routing path is established between itself and the target terminal to allow traffic signals to be sent via the routing path in a normal call. The routing path may be a multicast tree established using a protocol, e.g. the Internet Protocol, for packet data transmission within the system 100. The routing path may be established between a group of three or more terminals including itself and the target terminal. In a step 507, the BS 101 detects when a hang time is being applied in a call taking place via the routing path. For instance, the BS 101 may receive a message to indicate that the hang time has begun. The notification may be made by use of a special data packet understood by the BS 101.

A controlling processor (e.g. a zone controller in a TETRA system) which applies the hang time or another BS may send a notification signal to the BS 101 to indicate that the hang time has begun. For example, when a user of an MS which has initiated the call by operating a PTT button of the MS stops speaking and releases the PTT button, that MS may send a signal to the BS serving that MS and to the controlling processor, so that the serving BS and the controlling processor know when the hang time starts. The serving BS or the controlling processor can thereby notify other BSs (serving MSs in the call), including the BS 101, of the hang time start. Alternatively, a processor of the infrastructure of the system 100, e.g. a controlling processor such as a zone controller, can detect when a hang time needs to start, e.g. by detecting a suitably long pause in traffic flow on the allocated traffic channel, or by injecting a special data packet after a traffic stream in a known manner.

In a step 509, the BS 101 time stamps, e.g. by the timer 303, and sends the test signal to the target terminal via the established routing path. In a step 511, the target terminal receives the test signal. The target terminal recognizes and understands the test signal from the data contained in the test signal's structure.

In a step 513, response to receiving the test signal, the target terminal constructs and returns a response signal indicating its receipt of the test signal. In a step 515, the BS 101 receives the response signal and adds a reception time stamp, e.g. using the timer 303. In a step 517, the BS 101 calculates a transmission delay by: (i) calculating the difference in time between the transmission and reception time stamps applied respectively in steps 509 and 515 to obtain a two-way transmission delay; and (ii) dividing the two-way transmission delay by two to obtain the one-way transmission delay. In a step 519, the BS 101 records the one-way transmission delay obtained, e.g. in the memory 305, for future use.

If continuation of the call (in which the hang time detected in step 507 is applied) is detected in a step 521 before step 515 is reached, the current run of the method 500 may be suspended and a new run of the method 500 may be begun by returning to the step 503. It is likely, however, that in most instances steps 509 to 519 will be completed before any continuation of the call takes place. This is because the time required for a continuation request to be initiated and made by a user operating a PTT button (of a MS participating in the call) is likely to be much longer than the time required to carry out steps 509 to 519.

In a modification of the method 500, the target terminal may co-operate further with the BS 101 to measure the one-way transmission delay. For example, the target terminal may add a receipt time stamp upon receipt of the test signal in step 511 and may subsequently communicate the time of that reception time stamp back to the BS 101.

Alternatively, in a further modification, the target terminal may add a reception time stamp upon receipt of the test signal in step 511 and may then calculate the one-way transmission delay by calculating the difference in time between the transmission time stamp indicated in the received test signal which was applied by the BS 101 and the reception time stamp applied by the target terminal. The target terminal may subsequently communicate the calculated one-way transmission delay back to the BS 101 for recordal by the BS 101, e.g. in the memory 305. Alternatively, the target BS may record the one-way transmission delay in a memory of its own and may subsequently use the delay itself in an operation of the method 400 in which the target BS is the BS receiving a traffic signal from the BS 101. A similar procedure may be made in reverse by the target terminal sending a test signal to the BS 101 and the BS 101 measuring and recording the one-way transmission delay.

Figure 6:
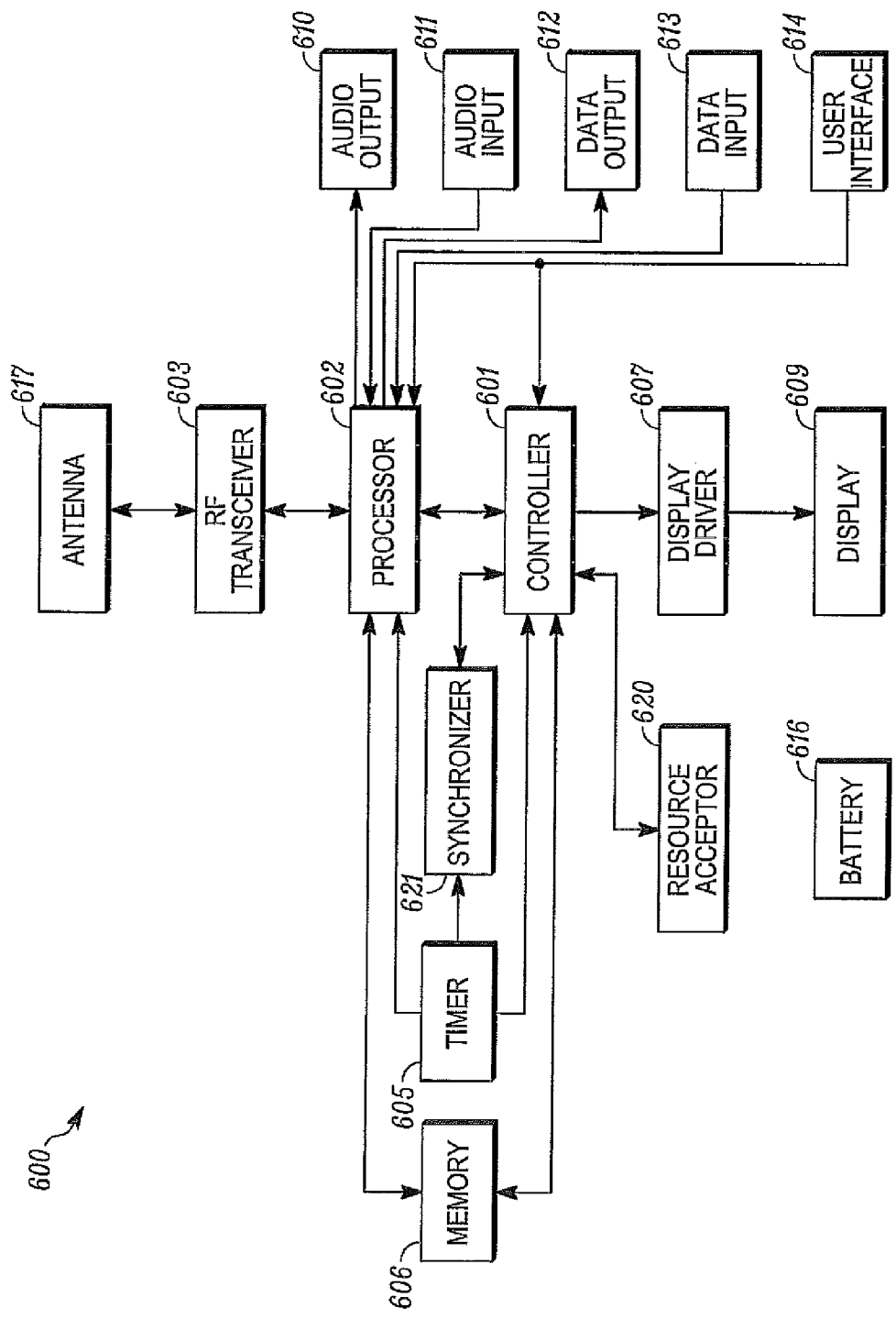
FIG. 6 is a block schematic diagram of an illustrative layout of a mobile station of the system of FIG. 1.

As will be apparent to those of ordinary skill in the art, the MSs of the system 100 may take a number of different possible forms depending on an implementation of the MS, e.g. according to whether the MS is a portable or mobile radio, a mobile telephone, a personal digital assistant, a wireless enabled mobile computing device, or another known mobile terminal. FIG. 6 shows a block diagram of an illustrative layout 600 of operational components present in the MS. Any one or more of the MSs of the system 100, including the MSs 104, 105, 107, 109, 124, 125, 127 and 129, may have the layout 600. Each MS may have more or less components than are shown in FIG. 6.

In the layout 600, a controller 601 controls functional operations of the MS. A processor 602 operably connected to the controller 601 processes information sent to and from the MS. The controller 601 and the processor 602 are operably connected to a timer 605 which provides an internal clock for operational timing, and to a memory 606 which stores data and programs needed in operation by the controller 601 and the processor 602. The timer 605 and the controller 601 are further connected to a synchronizer 621, which provides synchronization operations in the MS in a known manner.

The processor 602, which may for example comprise a digital signal processor, which may be included with the controller 601 in a common digital signal processing unit, is operably connected to a radio frequency (RF) transceiver 603 which transmits and receives RF signals including signals carrying information sent to and from the MS. The signals are delivered over-the-air to and from an antenna 617 connected to the RF transceiver 603.

When the RF transceiver 603 via the antenna 617 receives an RF signal including information representing communicated speech, the processor 602 extracts the speech information and delivers a signal including the extracted speech information to an audio output 610 which comprises a transducer such as a speaker which converts the signal to audio form to reconstruct the communicated speech for a user of the mobile station having the layout 600. The MS also includes an audio input 611 which comprises a transducer such as a microphone which converts speech of the user into the form of an electrical signal and delivers the signal to the processor 602 which processes the signal into a form suitable for inclusion in an RF signal for transmission by the RF transceiver 603 via the antenna 617.

When the RF transceiver 603 receives via the antenna 617 a signal representing user communicated (non-speech) data, e.g. alphanumeric characters representing words or numerals or picture or video information, the processor 602 extracts information relating to the communicated data and delivers a signal including the extracted data to a data output 612. The data output may for example comprise a connection to an external data processing terminal (not shown), e.g. a personal computer.

A data input 613 provides an input signal from a user including data to be communicated. The data input 613 may for example comprise a connection to a data source, e.g. a personal computer (not shown). The signal provided by the data input 613 is delivered to the processor 602 which processes information included in the signal into a form suitable for inclusion in an RF signal to be transmitted by the RF transceiver 603 via the antenna 617.

The MS having the illustrative layout 600 also includes a user interface 614, e.g. a keypad and control buttons including a PTT button, which allows a user to enter instructions and data into the MS. The user interface 614 is operably connected to the controller 601 to receive signals representing instructions entered by a user at the user interface 614. The user interface 614 is also operably connected to the processor 602 to enable a signal representing data entered by the user at the user interface 614 to be delivered to the processor 602. The processor 602 processes data included in the signal into a form suitable for inclusion in an RF signal to be transmitted by the RF transceiver 603 via the antenna 617.

The MS having the layout 600 also includes a resource acceptor 620 operably coupled to the controller 601. The resource acceptor 620 may be incorporated within the controller 601. The resource acceptor 620 is a processor or part of a processor, e.g. a digital signal processor, which operates a programmed algorithm. The resource acceptor 620 carries out functions within the MS relating to scheduling of communications between the MS and the BS serving the MS in accordance with the defined protocol by which the MS and BS operate. For example, the resource acceptor 620 may accept notification and allocation of times and channels made available by the resource scheduler 220 (FIG. 2) of the serving BS. Thus, the resource acceptor 620 ensures that, under control of the controller 601, downlink transmissions from the serving BS are received, and uplink transmissions to the BS are sent, at the specified times and on the specified channels.

The synchronizer 621 establishes current synchronization between a downlink data burst from the serving BS in a known manner, e.g. by finding a match between a fixed pattern of symbols contained in the data burst and a fixed pattern of the same symbols held by the synchronizer 621.

The MS having the layout 600 includes an electro-optical display 609 operable to display information to a user in a known manner. The display 609 is driven by a display driver 607 under control of the controller 601 in a known manner.

The MS having the layout 600 includes a battery 616 which provides a source of electrical energy for all active components of the MS.

In the foregoing specification, specific embodiments have been described. However, one of ordinary skill in the art will appreciate that various modifications and changes can be made without departing from the scope of the invention as set forth in the accompanying claims. Accordingly, the specification and drawings are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this patent application and all equivalents of those claims as issued.

Moreover in this document, relational terms such as 'first' and 'second', 'top' and 'bottom', and the like, may be used solely to distinguish one entity or action from another entity or action without necessarily requiring or implying any actual such relationship or order between such entities or actions. The terms 'comprises', 'comprising', 'has', 'having', 'includes', 'including', 'contains', 'containing' or any other variation thereof, are intended to cover a non-exclusive inclusion, such that a process, method, article, or apparatus that comprises, has, includes or contains a list of elements does not include only those elements but may include other elements not expressly listed or inherent to such process, method, article, or apparatus. An element preceded by 'comprises . . . a', 'has . . . a', 'includes . . . a', or 'contains . . . a' does not, without more constraints, preclude the existence of additional identical elements in the process, method, article, or apparatus that comprises, has, includes, contains the element. The terms 'a' and 'an' are defined as one or more unless explicitly stated otherwise herein. The terms 'substantially', 'essentially', 'approximately', 'about' or any other version thereof, are defined as being close to as understood by one of ordinary skill in the art, and in one non-limiting embodiment the term is defined to be within 10%, in another embodiment within 5%, in another embodiment within 1% and in another embodiment within 0.5%, of a stated value. The term 'coupled' as used herein is defined as connected, although not necessarily directly and not necessarily mechanically. A device or structure that is 'configured' in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for synchronization in a digital mobile communication system as described herein. The non-processor circuits may include, but are not limited to, a radio receiver, a radio transmitter, signal drivers, clock circuits, power source circuits, and user input devices. As such, these functions may be interpreted as steps of a method to perform the synchronization in a digital mobile communication system as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a 'processing device' for purposes of the foregoing discussion and claim language.

Moreover, an embodiment including a memory can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separately claimed subject matter.

The invention claimed is:

1. An apparatus for use in a mobile communication system including a plurality of mobile stations and a base station operable to serve the mobile stations with wireless communications and, associated with the base station, a channel selector operable to select and allocate downlink wireless traffic communication channels for sending downlink wireless traffic signals by the base station to the served mobile stations, the apparatus comprising:
a channel selector that is adapted to: (i) to obtain an estimate of a ready time when a downlink wireless traffic signal including traffic data received from a source remote to the base station to be sent to at least one of the served mobile stations will be ready for sending; and (ii) to select and allocate for sending the downlink traffic signal a downlink traffic channel which is the first downlink traffic channel available following the estimated ready time.

2. The apparatus according to claim 1, further including a remote source that conveys traffic data to the channel selector to be sent to the at least one of the served mobile stations and which remote source comprises, operably coupled to the base station, another base station, a mobile station, or a fixed terminal other than a base station.

3. The apparatus according claim 1, further including a ready time estimator that is operably coupled to the channel selector and that is operable to use an estimate of a transmission delay between the remote source and the base station to estimate the ready time.

4. The apparatus according to claim 3, wherein the apparatus is included in a base station and wherein the apparatus includes a memory operable to record estimates of transmission delays between different remote sources and the base station, and wherein the ready time estimator is operable to retrieve from the memory an estimate of the transmission delay between a particular remote source and the base station to use in estimating the ready time of a downlink traffic signal including traffic data from the particular remote source.

5. The apparatus according to claim 4 including, operably coupled to the memory, a transmission delay estimator operable to apply a test procedure to estimate a transmission delay between the base station and the remote source.

6. The apparatus according to claim 5 wherein the test procedure includes one or more of:
sending from the base station to the remote source a test data signal including a transmission time stamp indicating when the signal is transmitted; and
sending from the remote source to the base station a test data signal including a transmission time stamp indicating when the signal is transmitted.

7. The apparatus according to claim 6 wherein the test procedure includes the base station receiving a response signal sent from the remote source in response to receiving the test data signal from the base station and applying a reception time stamp to the response signal when received.

8. The apparatus according to claim 6 wherein the test procedure includes the base station receiving a time stamped response signal sent from the remote source in response to receiving the test data signal.

9. The apparatus according to claim 1 wherein the test procedure includes receiving, at one or more of the base station and the remote source, a test data signal that includes a transmission time stamp indicating when the signal is transmitted, applying a reception time stamp when the test data signal is received, estimating the one-way transmission delay using the transmission time stamp and the reception time stamp and recording the estimated delay.

10. A method of operation in a mobile communication system including a plurality of mobile stations, a base station operable to serve the mobile stations with wireless communications and, associated with the base station, a channel selector operable to allocate downlink wireless traffic communication channels for sending downlink wireless traffic signals by the base station to the served mobile stations, the method comprising:
  obtaining an estimate of a ready time when a downlink wireless traffic signal including traffic data received from a source remote to the base station to be sent to at least one of the served mobile stations will be ready for sending; and
  selecting and allocating for sending the downlink traffic signal a downlink traffic channel which is the first downlink traffic channel available following the estimated ready time.

* * * * *